US008417396B2

(12) United States Patent
Goodman et al.

(10) Patent No.: US 8,417,396 B2
(45) Date of Patent: Apr. 9, 2013

(54) AIR TRAFFIC CONTROL METHOD

(75) Inventors: William L. Goodman, Coupeville, WA (US); Syed T. Shafaat, Everett, WA (US); John A. Brown, Snohomish, WA (US); Jennifer L. Gertley, Issaquah, WA (US); Robert P. Smith, Clinton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/241,189

(22) Filed: Sep. 22, 2011

(65) Prior Publication Data

US 2012/0010763 A1 Jan. 12, 2012

Related U.S. Application Data

(62) Division of application No. 12/917,424, filed on Nov. 1, 2010, now Pat. No. 8,046,159, which is a division of application No. 11/600,012, filed on Nov. 14, 2006, now Pat. No. 7,848,877.

(51) Int. Cl.
*G01C 23/00* (2006.01)

(52) U.S. Cl. .......... 701/3

(58) Field of Classification Search .......... 701/7–9, 701/1–3, 14, 116–120
See application file for complete search history.

(56) References Cited

U.S. PATENT DOCUMENTS

| | | | | |
|---|---|---|---|---|
| 6,912,461 | B2 * | 6/2005 | Poreda | 701/120 |
| 2005/0049762 | A1 * | 3/2005 | Dwyer | 701/3 |
| 2005/0203675 | A1 * | 9/2005 | Griffin et al. | 701/3 |

* cited by examiner

*Primary Examiner* — Kim T Nguyen

(57) ABSTRACT

A method of operating an air traffic control system may include receiving, by a control system, an instruction from a control system user. The method may further include providing, by the control system, the instruction to an airplane via a data link between the control system and a system of the airplane. In addition, the method may include adjusting, by the airplane system, at least one airplane control to correspond to the instruction.

19 Claims, 6 Drawing Sheets

AIR TRAFFIC CONTROL METHOD

CROSS-REFERENCE TO RELATED APPLICATIONS

The present application is a divisional of and claims priority to pending application Ser. No. 12/917,424 entitled PROGRAMMING AIRPLANE SYSTEMS BASED ON INSTRUCTIONS filed on Nov. 1, 2010, which is a divisional application of application Ser. No. 11/600,012 (now U.S. Pat. No. 7,848,877) entitled DISPLAYING AND/OR PROGRAMMING AIRPLANE SYSTEMS BASED ON CLEARANCES AND/OR INSTRUCTIONS, the entire contents of each application being incorporated by reference herein.

FIELD

Embodiments relate to the field of data transmission and processing, in particular, to methods for receiving, by an airplane, clearances and/or instructions from a control system via a data link and displaying the received information.

BACKGROUND

Increases in the availability and usefulness of air travel for business and personal reasons have led to busier airports handling a larger number of airplanes landing in a smaller window of time. To provide clearance instructions, such as which runway to land on, air traffic control personnel must use a radio adapted to audibly send the instructions to an airplane flight crew. The flight crew must then manually program the clearances into a flight management system to receive further information, such as unique characteristics of a runway. Often, clearances are received very near landing, making manual entry highly inconvenient.

Instructions, informing a flight crew how closely to follow behind another plane, must also be provided by radio, and must be carried out by means of a pilot's own skill, visually judging the distance between the plane and the other plane to be followed by watching the other plane through the cockpit window. The only display panel provided by the airplane to the flight crew indicating a distance to the other plane is a Traffic Alert/Collision Avoidance System (TCAS) equipped to render a warning to the flight crew if a collision appears imminent.

BRIEF SUMMARY

The foregoing deficiencies of the prior art are met, to a great extent, by the present disclosure wherein a method of operating an air traffic control system may include receiving, by a control system, an instruction from a control system user. The method may further include providing, by the control system, the instruction to an airplane via a data link between the control system and a system of the airplane. In addition, the method may include adjusting, by the airplane system, at least one airplane control to correspond to the instruction.

In a further embodiment, disclosed is a method of operating a control system comprising the step of receiving, by the control system, at least one of a clearance and an instruction from a user of the control system. The control system may provide at least one of the clearance and the instruction to an airplane via a data link between the control system and a system of the airplane. The method may further include adjusting, by the airplane system, at least one airplane control to correspond to at least one of the clearance and the instruction. In addition, the method may include receiving, by the control system, an indication from the airplane system of whether at least one of the clearance and the instruction has been accepted or rejected.

Also disclosed is a method of operating a control system of an air traffic control system comprising the step of receiving, by a control system of the air traffic control center, at least one of a clearance and an instruction from air traffic control center personnel. The method may additionally include providing, by the control system, at least one of the clearance and the instruction to an airplane via a data link between the control system and a system of the airplane. If at least one of the clearance and the instruction is accepted, the method may further include loading, by the airplane system, at least one of the clearance and the instruction into the airplane system, and/or adjusting, by the airplane system, at least one airplane control to correspond to at least one of the clearance and the instruction. The method may also include receiving, by the control system, an indication from the airplane system of whether at least one of the clearance and the instruction has been accepted or rejected.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

Embodiments of the present disclosure will be described by way of exemplary embodiments, but not limitations, illustrated in the accompanying drawings in which like references denote similar elements, and in which.

DETAILED DESCRIPTION

Illustrative embodiments of the present disclosure include, but are not limited to, methods and apparatuses for receiving, by an airplane, one or more clearances and/or instructions from a control system via a data link between the control system and a system of the airplane. The system of the airplane may then facilitate a user in accepting or rejecting at least one of the received one or more clearances and/or instructions, and, if accepted, may load the clearance and/or instructions and/or adjust controls to correspond to the clearance and/or instructions. Further, the system of the airplane may be adapted to display indicia to a user as to whether the received instructions are met.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
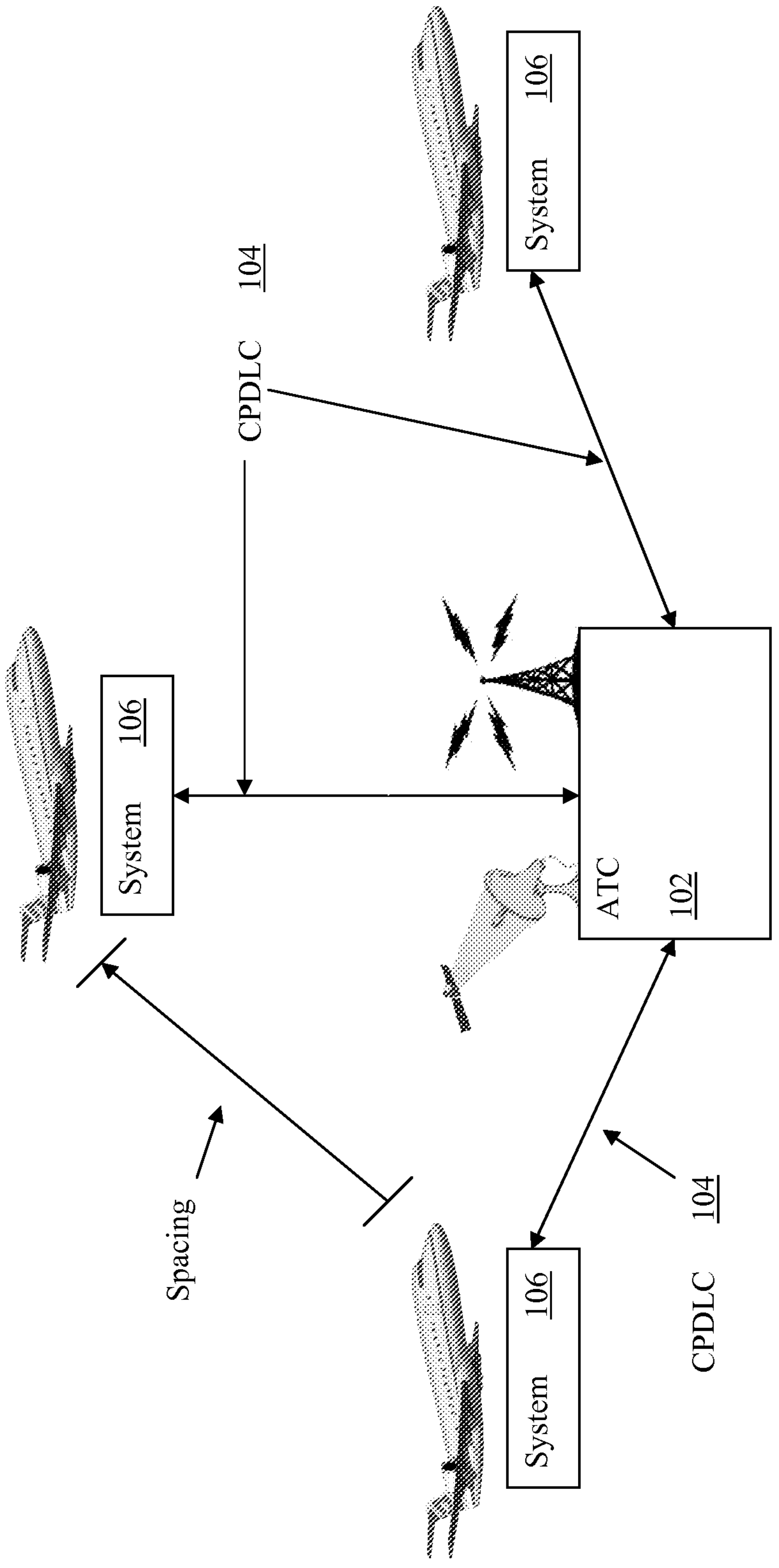
FIG. 1 illustrates an overview of various embodiments of the present disclosure, receiving, by an airplane, clearances and/or instructions from a control system via a data link and displaying the received information.

FIG. 1 illustrates an overview of various embodiments of the present disclosure, receiving, by an airplane, clearances and/or instructions from a control system via a data link and displaying the received information. As illustrated, an air traffic control center (hereinafter, ATC) 102 may be adapted to provide one or more clearances and/or instructions to a system 106 of an airplane (hereinafter, system 106) through controller to pilot data link communication (hereinafter, CPDLC) 104 connections between a control system of ATC 102 and systems 106. System 106 may then facilitate the flight crew of the airplane in determining whether to accept or reject the clearance(s) and/or instruction(s), in one embodiment by displaying the clearance(s) and/or instruction(s) to the flight crew. If accepted by the flight crew, system 106 may auto-load the clearance(s) and/or instruction(s) and may auto-adjust one or more airplane controls based on the clearance(s) and/or instruction(s). System 106 may also notify ATC 102 of the acceptance or rejection via CPDLC 104. In various embodiments, described further below in reference to FIGS. 3-5, system 106 may also be adapted to render, on one or more cockpit displays, indicia showing whether or not received instructions are being followed.

In various embodiments, ATC 102 may be a physical enclosure having a control system, a radio, and ATC 102 personnel. As is well known, an ATC such as ATC 102 may be a control tower of an airport located a convenient distance from one or more runways. ATC 102 need not be located in such an enclosure or be near runways, however, but may be in any place allowing for a CPDLC 104 connection between ATC 102 and one or more systems 106.

Figure 6:
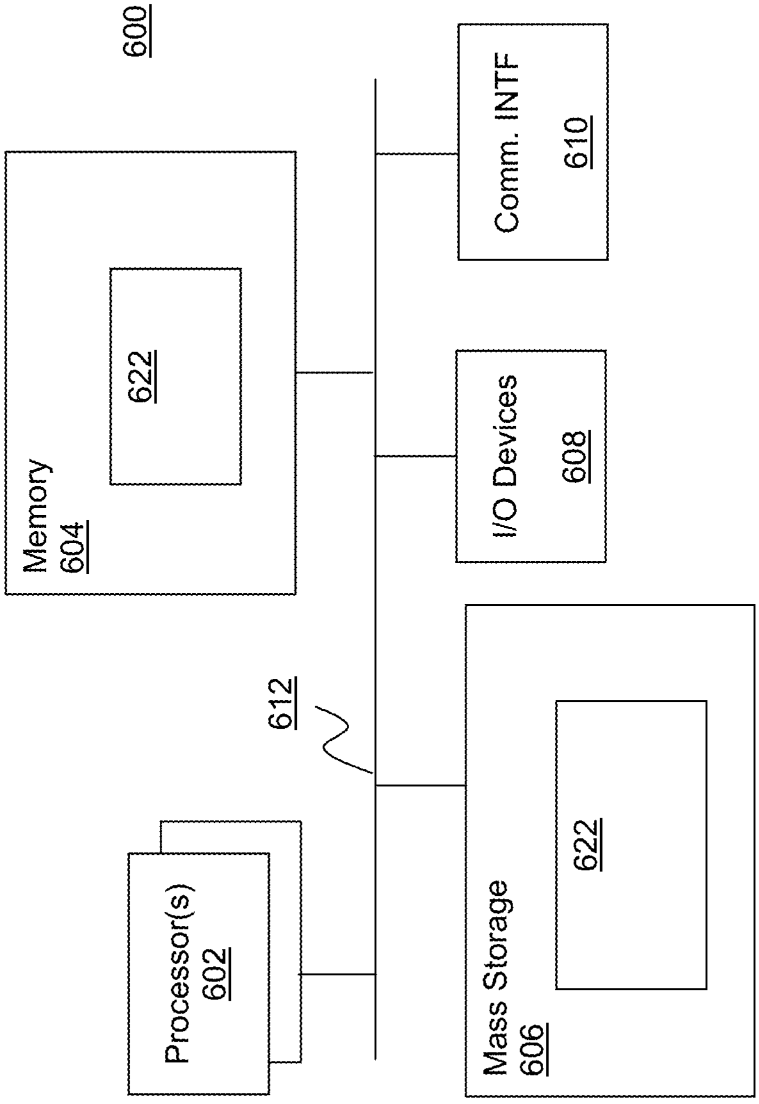
FIG. 6 illustrates an example computer system suitable for use to practice various embodiments of the present disclosure, capable of serving as the system of the airplane or the control system of the air traffic control center.

The control system of ATC 102 may comprise any single- or multi-processor or processor core central processing unit (CPU) computing system. The control system may be a personal computer (PC), a workstation, a server, a router, a mainframe, a modular computer within a blade server or high-density server, a personal digital assistant (PDA), an entertainment center, a set-top box, or a mobile device. An exemplary single-/multi-processor or processor core computing system of ATC 102 is illustrated by FIG. 6, and is described in greater detail below. Hereinafter, including in the claims, processor and processor core shall be used interchangeable, with each term including the other.

The radio of ATC 102, shown in FIG. 1, may be any radio known in the art capable of broadcasting radio waves of a low frequency, high frequency, very high frequency, ultra high frequency, or super high frequency. The radio may convey voice inputs of ATC 102 personnel, verbally conveying, for example, clearances and/or instructions. The radio may also be adapted to convey data inputs, providing the ATC 102 endpoint for CPDLC 104. In addition to a microphone/input unit, the radio may include a transceiver to send and receive radio wave signals.

ATC 102, as mentioned, may also have personnel capable of determining appropriate clearances and instructions for airplanes, for entering such clearances and/or instructions into a control system of ATC 102, and for providing clearances and/or instructions through voice over radio. Such personnel may be persons skilled in the control system and in directing and handling the landing and taking off of multiple airplanes, or may simply be any person(s) who happen to enter a clearance or an instruction into the control system.

In one embodiment, shown in FIG. 1, ATC 102 may also have access to a satellite transceiver capable of sending data to and receiving data from one or more remote satellites orbiting the Earth. The satellite transceiver may be of any sort known in the art, and may be directly or indirectly coupled to the control system of ATC 102 to relay clearances and instructions from the control system, and airplane acceptance/rejection notifications to the control system.

In various embodiments, the control system of ATC 102 may provide ATC 102 personnel with means of entering clearances and/or instructions, and in one embodiment, may provide ATC 102 personnel with means to aid in determining an appropriate clearance and/or instruction. Such a determining means may comprise a computer process asking for input from the personnel, such as a number of airplanes, a number of runways, distances of ones of the airplanes, etc., and providing, in return, an appropriate clearance and/or instruction. Clearances may be associated with one or more of departure information, arrival information, and approach information retrievable by system 106 upon receipt of the clearance(s). Instructions may specify a time or a distance separating the airplane receiving the instructions from another airplane and/or a speed to maintain in order to maintain a spacing distance between the airplane and the other airplane. Once personnel have determined appropriate clearance(s) and/or instruction(s), the personnel may enter the clearance(s) and/or instruction(s) via the entry means of the control system of ATC 102. The entry means may consist of physical or graphical controls, entered text/codes, or may be any other entry means known in the art.

Upon receiving clearance(s) and/or instruction(s), the control system of ATC 102 may provide the clearance(s) and/or instruction(s) to a system 106 of an airplane via CPDLC 104. The control system may be communicatively coupled to system 106 via a radio, directly or through a satellite, as described above, and may establish CPDLC 104 in such a manner as network communication connections are often established. For example, the control system may transmit a Hypertext Transfer Protocol (HTTP) packet to system 106, may receive an acknowledgement packet, and may thus establish a CPDLC 104 connection. Once the CPDLC 104 connection is established, the control system may transmit the clearance(s) and/or instruction(s) via CPDLC 104 in the same manner that it may transmit any data via a network connection.

In another embodiment, rather than having personnel enter the clearance(s) and/or instruction(s) through entry means of the control system, ATC 102 may allow ATC 102 personnel to enter the clearance(s) and/or instruction(s) through voice input to a radio microphone, the radio microphone connected to a radio transceiver of ATC 102 to transmit the voice input via radio waves.

In some embodiments, after transmitting the clearance(s) and/or instruction(s), the control system of ATC 102 may, at a subsequent point in time, receive from system 106 an indication of whether the flight crew using system 106 accepted or rejected the clearance(s) and/or instruction(s). The control system may receive the indication via CPDLC 104, either via the connection described above or via a second CPDLC 104 connection established by system 106. Once received, in some embodiments, the control system may display or otherwise convey the acceptance/rejection indication to ATC 102 personnel. If rejection, in some embodiments, the personnel may determine and enter into the control system of ATC 102 new clearance(s) and/or instruction(s).

As is shown, a CPDLC 104 may connect ATC 102 to a system 106 of an airplane. As mentioned above, CPDLC 104 may be any sort of data link/connection known in the art, including a conventional network connection, wherein system 106 and ATC 102 comprise endpoints of a local area network (LAN), a wide area network (WAN), or the Internet. CPDLC 104 may use any sort of communication protocol known in the art, such as HTTP, and any sort of transport protocol known in the art, such as the Transmission Control Protocol/Internet Protocol (TCP/IP) suite of protocols. To ensure secure transmission of the clearance(s) and/or instruction(s), CPDLC 104 may comprise a VPN or use some other sort of “tunneling” technology. In other embodiments, rather than relying on conventional networking technologies, CPDLC 104 may comprise a custom data link. Also, as mentioned above, CPDLC 104 may rely on any number of technologies to transmit the clearance(s) and/or instruction(s), such as satellite and/or radio technologies. Each of the airplane and ATC 102 may have one or both of radio transceivers for radio use and radio transceivers for satellite use, which may be the same transceiver. Thus, the signals comprising CPDLC 104 may be transmitted via radio waves. In one embodiment, multiple CPDLC 104 connections may exist between a system 106 and ATC 102. As suggested above, one CPDLC 104 connection may be established by ATC 102, and a second CPDLC 104 connection may be established by system 106. The first connection may transmit clearance(s) and/or instruction(s) from ATC 102 to the system 106, and the second connection may transmit acceptance/rejection indications from the system 106 to ATC 102. In other embodiments, one CPDLC 102 connection may transmit both the clearance (s) and/or instruction(s) and the acceptance/rejection indications.

As illustrated, each system 106 may be a computer system of an airplane communicatively connected to ATC 102 through at least CPDLC 104. The airplane may be an airplane in any phase of flight, nearing an airport having ATC 102, or may be a substantial distance away from ATC 102. The airplane may be any sort of airplane known in the art, except for system 106 and displays such as those illustrated by FIGS. 3-5, such as a 700-series aircraft of The Boeing Company of Chicago, Ill. The airplane may or may not have passengers, may have a flight crew comprising one or more pilots, stewards, and/or stewardesses, and may have cockpit, passenger, and/or cargo areas. In some embodiments, the airplane may also have a radio/satellite transceiver communicatively coupled to system 106. The radio/satellite transceiver may be adapted to receive clearance(s) and/or instruction(s) from ATC 102 via CPDLC 104 and to send indications of acceptance and/or rejection to ATC 102 via CPDLC 104. In one embodiment, the radio transceiver may facilitate the flight crew and ATC 102 personnel to communicating via voice inputs. In further embodiments, the cockpit of the airplane may be equipped with a plurality of computer systems, including system 106, and a plurality of displays, including those illustrated in FIGS. 3-5, and described in further detail below.

In various embodiments, system 106 may be any one or more computer systems of an airplane. The computer system or systems of system 106 may comprise any single- or multi-processor or processor core central processing unit (CPU) computing systems. System 106 may be one or more of a personal computer (PC), a workstation, a server, a router, a mainframe, a modular computer within a blade server or high-density server, a personal digital assistant (PDA), an entertainment center, a set-top box, or a mobile device. An exemplary single-/multi-processor or processor core computer system of system 106 is illustrated by FIG. 6, and is described in greater detail below. Hereinafter, including in the claims, processor and processor core shall be used interchangeable, with each term including the other. In some embodiments, the displays rendering the indicia shown in FIGS. 3-5 may be display devices of system 106, while, in other embodiments, they may be displays of another computing device communicatively coupled to system 106.

As described above, system 106 may receive clearance(s) and/or instruction(s) via means of the airplane having system 106, such as a radio/satellite transceiver. System 106 may be communicatively coupled to such means through any mechanism known in the art. If the clearance(s) and/or instruction(s) were received via CPDLC 104, system 106 may convey the clearance(s) and/or instruction(s) to the flight crew via some output mechanism, such as a display or audio speaker. For example, system 106 may render or cause to be rendered graphic or textual representations of the clearance(s) and/or instruction(s) on a cockpit display device, which may be the same device rendering the displays depicted in FIGS. 3 and/or 4, or may be a separate display device. Such graphic representations may include, in the case of received instruction(s), a depiction of the airplane having system 106 and the airplane to be followed, with the airplane to be followed depicted as highlighted. In addition to rendering the clearance(s) and/or instruction(s), system 106 may also render or cause to be rendered additional textual or graphic information to facilitate the flight crew in determining whether to accept or reject clearance(s) and/or instruction(s). Such additional information may comprise weather conditions, a number of airplanes in a flight space, etc. System 106 may also associate the clearance(s) and/or instruction(s) with a graphical or physical control or controls capable of being actuated by the flight crew. For example, the display rendering the clearance(s) and/or instruction(s) may be a touch-sensitive display and may also render “accept” and “reject” graphic buttons that may be actuated by a flight crew touch on the portion of the display rendering the graphic button.

In another embodiment, the clearance(s) and/or instruction (s) may be transmitted via radio waves other than CPDLC 104, received by a radio transceiver of the airplane having system 106, and may be output by a speaker of the airplane. The speaker may then output the radio wave signals, and flight crew may program the clearance(s) and/or instruction (s) into system 106, if the flight crew chooses to accept them. In one embodiment, rather than simply outputting the audio signals with a speaker, a computer system of the airplane, such as system 106, may apply speech recognition technologies to the radio signals to translate the verbal clearance(s) and/or instruction(s) into the same data format transmitted over CPDLC 104, and may display/convey the clearance(s) and/or instruction(s) in any of the manners described above, or in any manner known in the art.

Regardless of whether the clearance(s) and/or instruction (s) are accepted or rejected by the flight crew, and whether the acceptance/rejection was received through actuation of a graphical/physical control, system 106 may transmit data indicating acceptance/rejection of the clearance(s) and/or instruction(s) to ATC 102 via CPDLC 104. System 106 may send the data to the airplane's radio/satellite transceiver, which may then transmit the data to ATC 102, directly or indirectly. If the acceptance/rejection was received through voice inputs into a microphone communicatively coupled to system 106, system 106 may transmit the voice inputs to ATC 102 through a radio transceiver of the airplane. In one embodiment, the clearance(s) and/or instruction(s) may be transmitted through one of CPDLC 104 and radio voice inputs, and the flight crew response may be transmitted via the other of the two.

In various embodiments, if the clearance(s) and/or instruction(s) are accepted by the flight crew, system 106 may automatically load the clearance(s) and/or instruction(s) and/or may adjust one or more controls of the airplane based on the clearance(s) and/or instruction(s). For example, if a clearance has been accepted, and the clearance is associated with arrival information, system 106 may retrieve the arrival information and, if the arrival information includes one or more settings, system 106 may tune one or more controls to correspond to those settings. Such arrival information may be retrieved from a local or a remote database. In addition to adjusting controls based on the retrieved information, system 106 may also display the retrieved information, such as rendering or causing to be rendered textual or graphic representation of arrival information, which may include runway conditions. In another example, if instructions have been accepted, various control settings may be automatically adjusted by system 106 in order to acquire or maintain, for example, an instructed spacing.

In some embodiments, after system 106 has loaded the clearance(s) and/or instruction(s) and/or adjusted controls, system 106 may cause the airplane to go into an auto-pilot mode to carry out the further actions in view of the information retrieved based on the clearance(s) and/or the instruction (s), carrying out, for example, a landing based on retrieved arrival information or a flight speed and pattern to maintain an instructed spacing.

Figure 3:
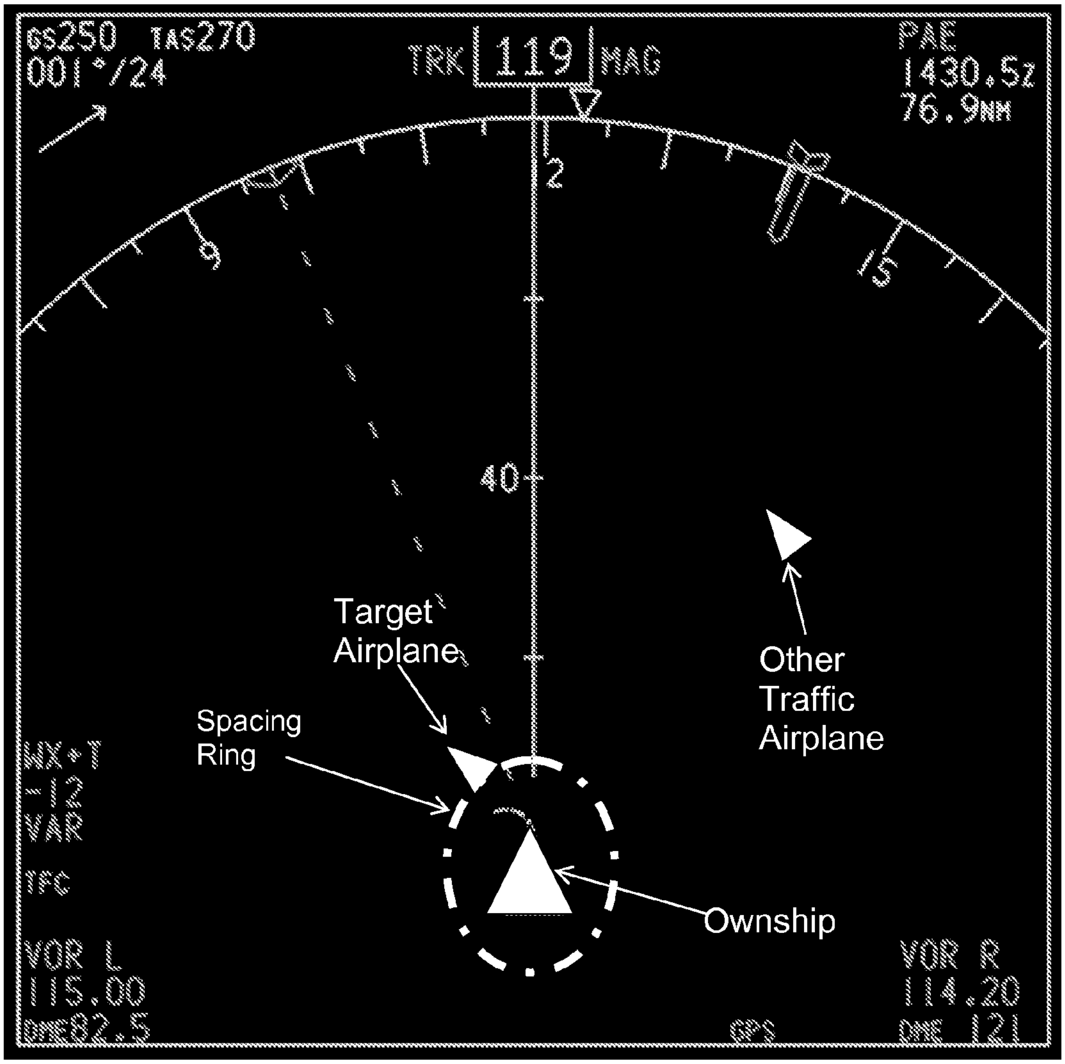
FIG. 3 illustrates a first navigation display equipped to render indicia of whether received instructions are being met.
Figure 4:
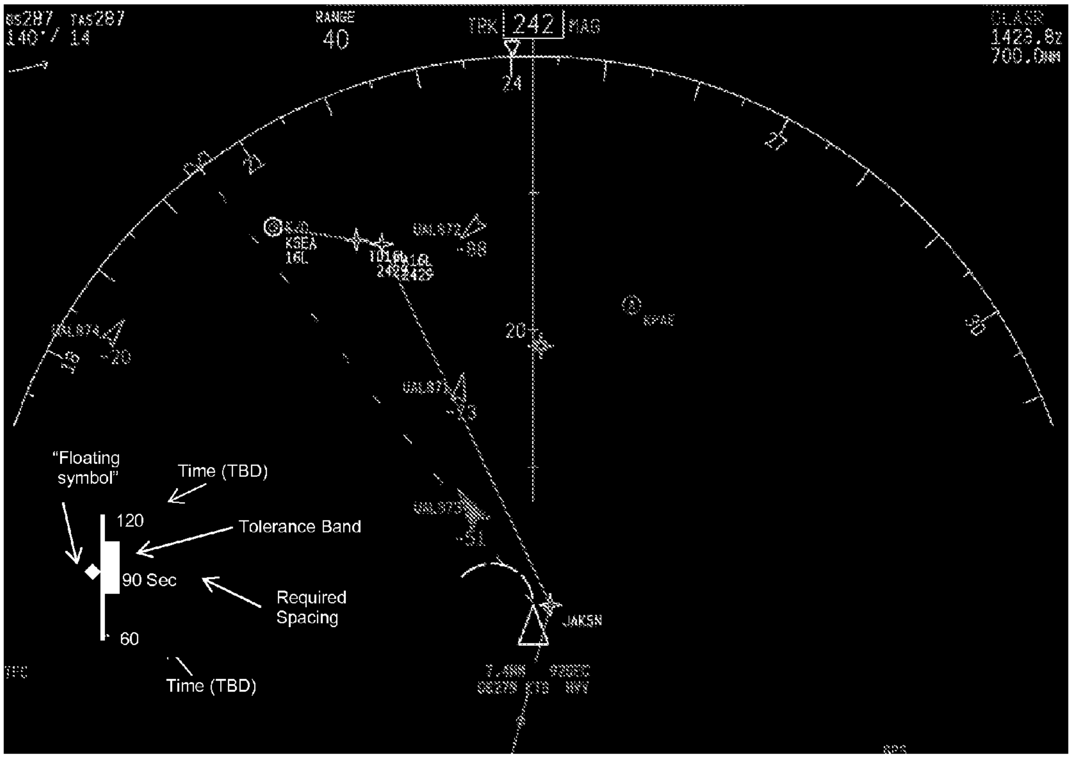
FIG. 4 illustrates a second navigation display equipped to render indicia of whether received instructions are being met, the indicia including a time scale.
Figure 5:
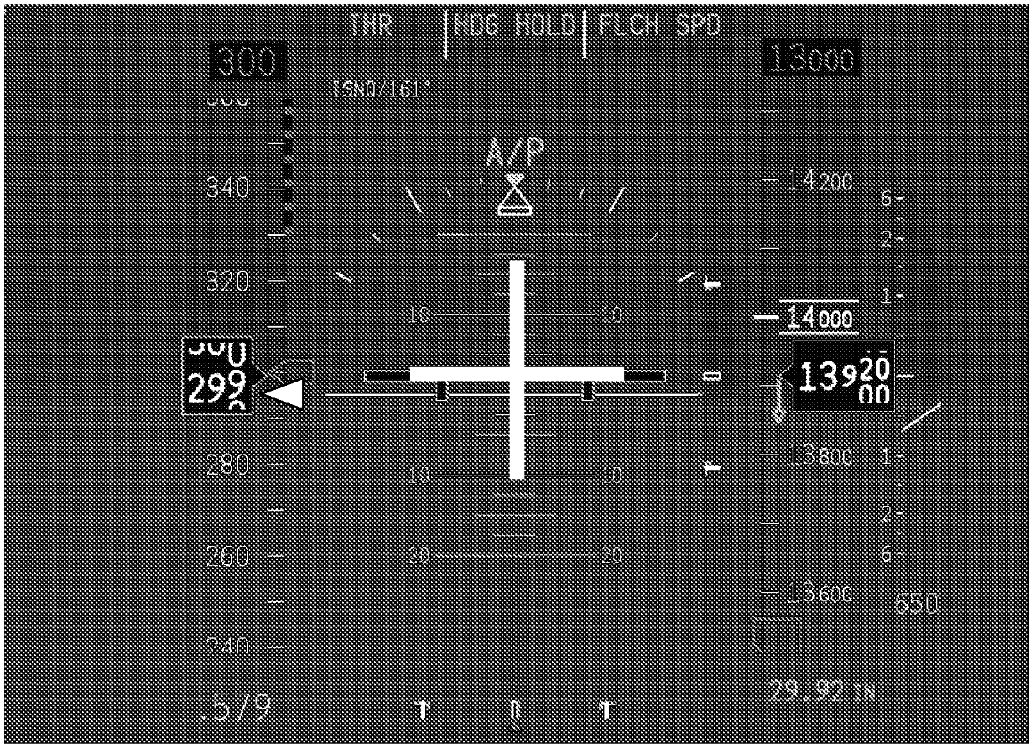
FIG. 5 illustrates a primary flight display equipped to render indicia of whether received instructions are being met, the indicia including a target speed.

Further, as is shown in FIGS. 3-5 and described in further detail below, indicia depicting whether received instructions are being met may be rendered on display devices. Such indicia may be rendered even before the instructions' acceptance, or may only be rendered after acceptance as a metric of success in carrying out the instructions. Such renderings by system 106 may, if the instructions are spacing instructions, indicate both the airplane having system 106 and another airplane to be followed, as well as indicia showing whether the desired spacing has been achieved and suggesting an action to take to achieve the spacing (i.e., speed up, slow down, etc.).

Figure 2A:
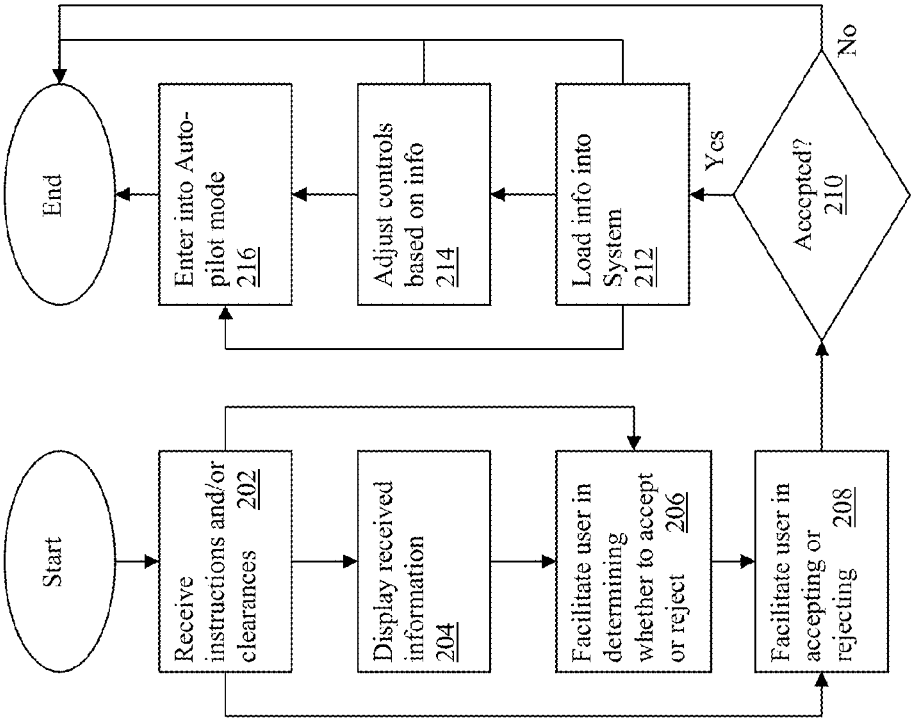
FIGS. 2*a*-2*b* illustrate flow chart views of selected operations of the methods of various embodiments of the present disclosure.
Figure 2B:
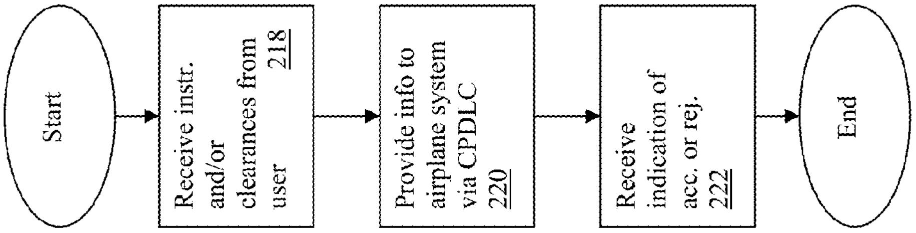

FIGS. 2*a*-2*b* illustrate a flow chart views of selected operations of the methods of various embodiments of the present disclosure.

FIG. 2*a* illustrates a flow chart view of the operations of an airplane, in accordance with various embodiments. As illustrated, in some embodiments, a transceiver of an airplane may receive clearance(s) and/or instruction(s) from an ATC via a CPDLC connection, block 202. In one embodiment, clearances may be associated with one or more phases of flight, such as departure information, arrival information, and approach information retrievable by a system of the airplane. Instructions, such as spacing instructions, may indicate a speed, a time, or a distance to separate the receiving airplane from an airplane to follow, as well as heading information directing the receiving airplane how to achieve the desired spacing. The airplane may receive the clearance(s) and/or instruction(s) through a radio/satellite transceiver of the airplane, which may be communicatively coupled to a system of the airplane.

In some embodiments, a system of the airplane, upon receiving the clearance(s) and/or instruction(s) from the transceiver of the airplane, may display, cause to be displayed, or otherwise convey the clearance(s) and/or instruction(s), block 204. For example, if instructions, such as spacing instructions, were received, the system may display both the receiving plane and another plane to be followed. Further, the system may facilitate a flight crew member/system user in determining whether to accept or reject the clearance(s) and/or instruction(s), block 206. In one embodiment, the system may highlight the airplane to be followed, displayed to the system user as described above, to aid the system user in determining whether a spacing provided by the instruction is desirable. In another embodiment, the system may retrieve information based on a received clearance, such as weather conditions associated with a runway that the clearance suggests the plane should land on, and may display the retrieved information to the system user to aid the user in determining whether to accept or reject the clearance. In addition to conveying the clearance(s) and/or instruction(s) and indicia suggesting whether to accept or reject the clearance(s) and/or instruction(s), the system may facilitate a flight crew member/user in accepting or rejecting the clearance(s) and/or instruction(s), block 208. The system may facilitate a user in accepting or rejecting the clearance(s) and/or instruction(s) by providing graphical or physical controls associated with the "accept" and "reject" options.

As shown, in decision block 210, if the user rejects the clearance(s) and/or instruction(s), the system notifies the ATC of the rejection, and the method terminates. If, however, the user accepts, decision block 210, the system may notify the ATC of the acceptance, may load the clearance(s) and/or instruction(s) into the system, and may adjust one or more controls of the airplane based on the clearance(s) and/or instruction(s), blocks 212-214. For example, the system may automatically load the clearance(s) and, based on the clearances, retrieve departure, arrival, or approach information, block 212. In another example, loading the clearance(s) and/or instruction(s) may comprise, rendering or causing to be rendered, by the system, indicia of the airplane, an airplane to be followed, and a status indicating whether an instruction is being followed, block 212. Such displays are described below in reference to FIGS. 3-5. Also, the system may adjust one or more controls, such as speed or attitude settings, among many others, block 214. The amount of adjusting may be based on the clearance(s) and/or instruction(s). In various embodiments, after loading and or adjusting, the system may cause the airplane to enter into auto-pilot mode, block 216.

FIG. 2*b* illustrates a flow chart view of the operations of an ATC, in accordance with various embodiments. As illustrated, in some embodiments, a control system of an ATC may receive clearance(s) and/or instruction(s) from ATC personnel, and may provide the clearance(s) and/or instruction(s) to a system of an airplane via a CPDLC connection, blocks 218-220. The clearance(s) and/or instruction(s) may be entered into the control system through graphic, textual, or verbal inputs, block 218, and may be sent via a radio/satellite transceiver of the ATC to the airplane over a CPDLC connection that may be established by either of the airplane and the ATC, block 220. At some later point in time, the ATC may receive from the system of the airplane an indication of the acceptance or rejection of the clearance(s) and/or instruction (s), block 222. In one embodiment, the indication may be sent to the control system of the ATC via a CPDLC connection with the system of the airplane, which may be the same CPDLC connection over which the clearance(s) and/or instruction(s) were sent.

FIG. 3 illustrates a first navigation display equipped to render indicia of whether received instructions are being met. As illustrated, a display device may render a plurality of indicia representing the airplane having the display device ("the airplane"), the airplane to be followed ("the target airplane"), and an indication of whether a spacing specified by a received instruction has been attained. The spacing may be measured in time or distance from the target airplane. The airplane may be depicted as the centrally located symbol (here, labeled "ownship"). The target airplane may be depicted as a similar symbol (here, labeled "target airplane"). Also, the display may render a hollow ring shaped symbol around the airplane to graphically show a required spacing between the airplane and the target airplane (here, labeled "spacing ring"). The initial radius of the spacing ring may, in one embodiment, be a function of heading off initial track, wind velocity, true airspeed, bank angle, and roll rate for a turn. As is shown here, the spacing ring may contact the target plane, indicating that the specified spacing has been achieved. In other displays not depicted however, the target airplane may be some distance from the spacing ring, indicating that the spacing instruction has not been achieved. In one embodiment, the spacing ring may change color when the specified spacing has been achieved. Changes in the color of the ring and other symbols may also be used for other purposes, such as warning that the target airplane is too close. Additionally, in one embodiment, the display of FIG. 3 may further render additional instructions or information in textual characters or graphic components.

FIG. 4 illustrates a second navigation display equipped to render indicia of whether received instructions, such as spacing instructions are being met, the indicia including a time or a distance scale. As illustrated, a display may render a time scale, the time scale indicating a spacing, measured in units of time, as the midpoint of the time scale. The time scale may also have upper and lower boundaries which may vary, for example, based upon the need for precision. A symbol, referred to here as the "floating symbol" may also be depicted alongside the scale. The symbol may represent the plane specified by a spacing instruction as the airplane to be followed, and it may be located at a specific point on the scale corresponding to the time associated with its current spacing from the airplane having the display. As the spacing changes, the floating symbol may move up or down the time scale. If the spacing extends or narrows beyond a time measured by the scale, the floating symbol may stop at that upper/lower time boundary, and may change shape or color to indicate that it is beyond the times shown by the scale. In one embodiment, a "tolerance band" may be added to the time scale to indicate acceptable time deviations from the required spacing. In another embodiment, not shown, the time scale may instead be a distance scale depicting in some manner the distance specified by the instruction (in embodiments where the instruction is a spacing instruction) and an indicator of whether that distance has yet been achieved. In some embodiments, both time and distance scales may be displayed to flight personnel. Additionally, in one embodiment, the display of FIG. 4 may further render additional instructions or information in textual characters or graphic components.

FIG. 5 illustrates a primary flight display equipped to render indicia of whether received instructions, such as spacing instructions, are being met, the indicia including a target speed. As illustrated, a primary flight display or other suitable flight deck display may provide a speed reference indicating whether instructions are being met. The display may show both a current speed of the airplane having the display ("the airplane") and a speed to fly which, if flown, will cause the airplane to achieve and maintain the specified spacing between the airplane and another airplane specified by the spacing instruction as the airplane to be followed ("the target airplane"). The spacing may be measured in either time or distance, and the speed to fly may depend upon the target airplane speed, speed limitations of the airplane, current speed, current spacing, assigned spacing, distance or time left until a point at which the specified spacing must be achieved, altitude, airplane performance, required acceleration/deceleration, airplane weight, and atmospheric conditions. The current speed and the speed to fly may be indicated along a numerical speed scale by separate and distinct indicia conveying to the flight crew viewing the display both what speed they are flying and what speed they need to fly. In various embodiments, the shape of the indicie of the speed to fly may be similar to the shape of the target airplane. Additionally, in one embodiment, the display of FIG. 5 may further render additional instructions or information in textual characters or graphic components.

FIG. 6 illustrates an example computer system suitable for use to practice various embodiments of the present disclosure, capable of serving as the system 106 or the control system of ATC 102. As shown, computing system 600 includes a number of processors or processor cores 602, and system memory 604. For the purpose of this application, including the claims, the terms "processor" and "processor cores" may be considered synonymous, unless the context clearly requires otherwise. Additionally, computing system 600 includes mass storage devices 606 (such as diskette, hard drive, compact disc read only memory (CDROM) and so forth), input/output devices 608 (such as keyboard, cursor control and so forth), including, in some embodiments, a display capable of rendering the representations shown by at least one of FIGS. 3-5, and communication interfaces 610 (such as network interface cards, modems, and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing the various components, herein collectively denoted as 622. The various components may be implemented by assembler instructions supported by processor(s) 602 or high-level languages, such as C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The constitution of these elements 602-612 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A method, comprising:

receiving, by a control system, an instruction from a control system user;

providing, by the control system, the instruction to an airplane via a data link between the control system and a system of the airplane;

rendering, on a display device of the airplane, the following information representative of the instruction:

a representation of the airplane and another airplane to be followed;

a representation of a time or a distance separating the airplane from the other airplane; and adjusting, by the airplane system, at least one airplane control to correspond to the instruction and the information rendered on the display device.

2. The method of claim 1, further comprising the step of:

receiving, by the control system, an indication from the airplane system of whether the instruction has been accepted or rejected.

3. The method of claim 1, further comprising the step of:

displaying, by the control system, an indication of whether the instruction has been accepted or rejected.

4. The method of claim 1, wherein the instruction specifies:

a speed to maintain a spacing between the airplane and the other airplane.

5. The method of claim 1, further comprising the steps of:

receiving, by the control system, a clearance from the user of the control system;

providing, by the control system, the clearance to the airplane via the data link; and adjusting, by the airplane system, at least one airplane control to correspond to the clearance.

6. The method of claim 5, wherein the clearance is associated with at least one of the following:

departure information, arrival information, and approach information retrievable by the system of the airplane.

7. The method of claim 1, further comprising the step of:

loading, by the airplane system, the instruction into the airplane system.

8. The method of claim 1, wherein the control system comprises a control system of an air traffic control center.

9. The method of claim 1, wherein the control system comprises at least one of the following:

a personal computer, a workstation, a server, a router, a mainframe, a modular computer, a personal digital assistant, an entertainment center, a set-top box, a mobile device.

10. The method of claim 1, further comprising the steps of:

entering the instruction into the control system through at least one of graphic, textual, and verbal inputs; and sending, by the control system, the instruction to the airplane system via at least one of a radio transceiver and a satellite transceiver.

11. A method of operating a control system, comprising:

receiving, by the control system, at least one of a clearance and an instruction from a user of the control system;

providing, by the control system, at least one of the clearance and the instruction to an airplane via a data link between the control system and a system of the airplane;

rendering, on a display device of the airplane, the following information representative of the instruction:

a representation of the airplane and another airplane to be followed;

a representation of a time or a distance separating the airplane from the other airplane;

adjusting, by the airplane system, at least one airplane control to correspond to at least one of the clearance and the instruction and the information rendered on the display device; and receiving, by the control system, an indication from the airplane system of whether at least one of the clearance and the instruction has been accepted or rejected.

12. The method of claim 11, further comprising the step of:

loading, by the airplane system, at least one of the clearance and the instruction into the airplane system.

13. The method of claim 11, further comprising the step of:

displaying, by the control system, an indication of whether at least one of the clearance and the instruction has been accepted or rejected.

14. The method of claim 11, wherein the clearance is associated with at least one of the following:

departure information, arrival information, and approach information retrievable by the system of the airplane.

15. The method of claim 11, wherein the instruction specifies:

a speed to maintain a spacing between the airplane and the other airplane.

16. The method of claim 11, wherein the control system comprises a control system of an air traffic control center.

17. The method of claim 11, wherein the control system comprises at least one of the following:

a personal computer, a workstation, a server, a router, a mainframe, a modular computer, a personal digital assistant, an entertainment center, a set-top box, a mobile device.

18. The method of claim 11, further comprising the steps of:

entering at least one of the clearance and the instruction into the control system through at least one of graphic, textual, and verbal inputs; and sending, by the control system, at least one of the clearance and the instruction to the airplane system via at least one of a radio transceiver and a satellite transceiver.

19. A method of operating a control system of an air traffic control system, comprising:

receiving, by a control system of the air traffic control center, at least one of a clearance and an instruction from air traffic control center personnel;

providing, by the control system, at least one of the clearance and the instruction to an airplane via a data link between the control system and a system of the airplane;

performing the following if at least one of the clearance and the instruction is accepted:

loading, by the airplane system, at least one of the clearance and the instruction into the airplane system;

rendering, on a display device of the airplane, the following information representative of the instruction:

a representation of the airplane and another airplane to be followed;

a representation of a time or a distance separating the airplane from the other airplane; and adjusting, by the airplane system, at least one airplane control to correspond to at least one of the clearance and the instruction and the information rendered on the display device; and receiving, by the control system, an indication from the airplane system of whether at least one of the clearance and the instruction has been accepted or rejected.

* * * * *